United States Patent [19]

Fels

[11] 3,934,787

[45] Jan. 27, 1976

[54] METHOD OF MOUNTING PIPE FLANGES IN THE WALL OF A PRESSURE VESSEL

[75] Inventor: Emil Fels, Pratteln, Switzerland

[73] Assignee: Buss, A.G., Basel, Switzerland

[22] Filed: June 17, 1974

[21] Appl. No.: 480,100

Related U.S. Application Data

[63] Continuation-in-part of Ser. No. 317,163, Dec. 21, 1972, abandoned.

[30] Foreign Application Priority Data

Dec. 18, 1971 Switzerland.................... 019005/71

[52] U.S. Cl.............................. 228/184; 285/189
[51] Int. Cl.²................... B23K 31/02; F16L 13/04
[58] Field of Search............ 228/178, 184; 285/189; 220/3

[56] References Cited
UNITED STATES PATENTS

| | | | |
|---|---|---|---|
| 1,937,606 | 12/1933 | Taylor............................ | 228/138 X |
| 1,966,403 | 7/1934 | Durham.......................... | 285/189 X |
| 2,177,127 | 10/1939 | Harter.............................. | 228/178 |
| 2,981,556 | 4/1961 | Jackson.......................... | 285/189 X |
| 3,171,790 | 3/1965 | Challender et al. ............... | 220/3 X |
| 3,456,831 | 7/1969 | Johansson........................ | 228/184 X |

Primary Examiner—Al Lawrence Smith
Assistant Examiner—K. J. Ramsey
Attorney, Agent, or Firm—Abraham A. Saffitz

[57] ABSTRACT

A method for welding of steel pipe to a pressure vessel comprising the steps of cutting an opening in the wall of the pressure vessel, joining a connection member which consists of a thickened rim or lenticularly shaped disc, aligning the disc with a bore at a right angle to a tangential plane of the outer surface of the connection member, and welding in two specific areas whereby said first weld at the rim of said forged disc to the wall of said pressure vessel has greater strength against notch breaking at the thicker portion and the second welding at the opening of the wall of said pressure vessel provides a smooth transition.

1 Claim, 5 Drawing Figures

METHOD OF MOUNTING PIPE FLANGES IN THE WALL OF A PRESSURE VESSEL

This application is a Continuation-In-Part of Application Ser. No. 317,163, filed Dec. 21, 1972, now abandoned, on MOUNTING PIPE FLANGES IN THE WALL OF A PRESSURE VESSEL.

In the construction of pressure vessels, there is a trend to use high quality low alloy steels in place of plain carbon steel. Low alloy steels have higher static and dynamic strength properties and permit the use of decreased wall thickness for a given design pressure, this in turn resulting in interesting material savings and thereby also permits corresponding reduction in the heaviness of the vessel supports.

All pressure vessels require various nozzles, branch connections and covers, but the cut-outs thus necessary on cylindrical, or conical, or spherical vessels always result in a weakening of the wall structure.

This inevitably lowers the admissible maximum pressure especially on vessels to be used in the higher pressure range. Compensation to overcome the weakening by cut-outs on such vessels have-to-fore practiced by one of the following:

use of vessels with increased wall thickness;
reinforcing stiffening collars around the cut-out;
pipe branch of the flange with increased wall thickness;
disc and pipe reinforcements used in combination.

Some of these conventional measures are illustrated by FIGS. 1a and 1b. But when use is made of high strength low alloy steel, then all branched connections must be by through welds with full penetration. Obviously under such conditions, connections as illustrated by FIGS. 1a and 1b are no longer permissible. This also applies to many other simple weld flange connections, which because of their low strength, danger of double stress, and lack of dynamic strength in the direction of the vessel wall thickness, are no longer allowable. There exist furthermore always varying external stress loads, such as for example produced by the thermal expansion of the wall of the vessel or increasing temperature of piping branched by welding to the flanges. All these have to be taken into consideration as well.

At the points of material transition, resulting from the reinforced welded joints, the maximum permissable strength is limited by the notch sensitivity. To overcome this drawback, the past art has used complicated design with stiffeners and reinforcements, and this again was only satisfactory if the wall of the vessel had sufficient thickness. But even so the design of acceptable smaller diameter branched connections is desirably not to be made in axial-symmetry to the vessel's wall, but instead is to be made tangentially or nearly so, and this requirement remained an unsolved problem.

The present invention discloses a method for weld joints for branched pipe connections to pressure vessels, the method being characterized by welding into the opening a centrally thickened connector piece having a form so that a bore therein will be practically at right angle to a plane tangential over the surface of the connector and that a branch pipe then is welded into the bore.

A connector useful for the method is characterized that its thickness in the bore area has several times the thickness of its border rim which is to be welded into the vessel's wall. Preferably, the connector may be in the form of a lenticular forged disc.

In order that the invention may be well understood, it will be further described by way of example only, with reference to the accompanying drawings, which show several embodiments thereof.

In particular,

Figure 2:
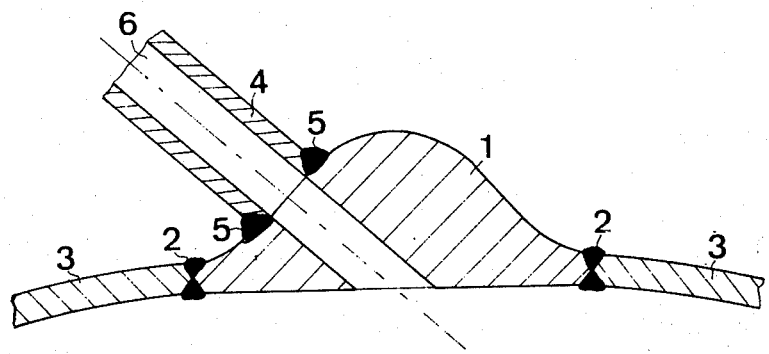
FIG. 2 shows a first embodiment of the connection according to the invention in a cross-section.
Figure 3:
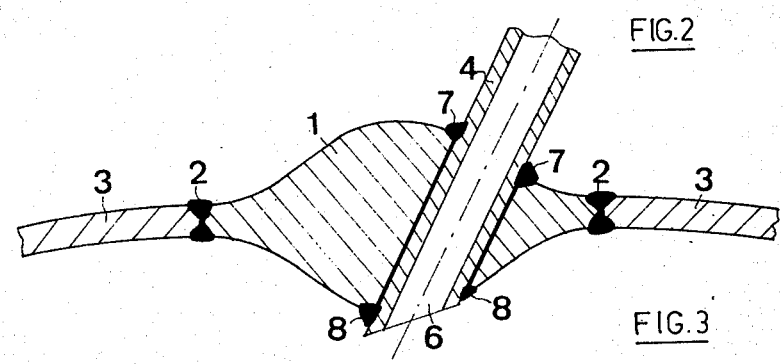
FIG. 3 shows a second embodiment.

The connection member according to FIG. 2 has substantially the form of a disc 1 with its one face plane and its other face convex. Along its rim, it is welded at 2 to the wall 3 of a pressure vessel. The weld 2 has full penetration and is accessible from both sides. A bore 6 has been drilled through the disc 1 and a pipe 4 is welded to it so that the bore 6 forms the continuance of the pipe 4. Alternatively, as shown in FIG. 3, the pipe 4 may also be pushed through the bore 6 and securely connected by weld 7. A further weld 8 at the side where pipe 4 emerges on the inside of the vessel serves to seal and reinforce the pipe connection.

As can be seen from FIG. 3, the disc 1 again has the form of a lenticule, but both faces being of convex shape.

Figure 4:
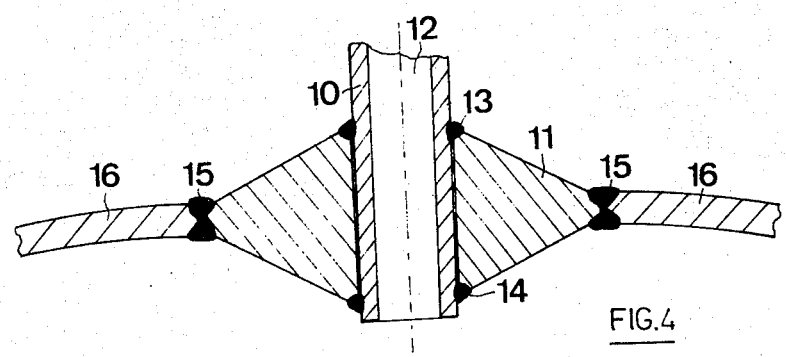
FIG. 4 shows a third embodiment.

A further embodiment is shown in FIG. 4. Whenever a tube of relatively larger diameter is centrally connected to a vessel via a connection member according to the invention, the remaining surface of the latter is nearly plane. Therefore, the connection member according to FIG. 4 has the form of a double cone. There is only a minor decrease in strength of this connection, but in turn, the machining of the forged connection member is facilitated. The connection of a tube 10 in the bore 12 of the member 11 is performed analogously by means of welds 13 and 14, while the member 11 is connected to the vessel wall 16 by weld 15.

The principle advantages obtained by the new method are manufacturing ease, reliability, and ease of inspection, to wit:

Welds between the connection member and the walls 2 of pressure vessels are easily made, they have high reliability, can be practiced with certainty, and will be always accessible for inspection. The smooth transition from the weld 2 at the wall to the rim of the piece 1 minimizes notch sensitivity.

In addition, there remains always adequate free space to select the optimum direction for the branch connection leading into the vessel even if the pipe has to be lead tangentially to the vessel's wall.

The convex form of the piece 1 excludes narrow angles between the surface and the pipe 4, so that a high quality weld 5 or 7 is always possible. The lenticular form permits an optimum compensation and distributes the stress trajactories in an especially advantageous manner, thereby minimizing the notch sensitivity of the whole construction.

EXAMPLE 1

The following example of the invention shows more clearly the advantages of the new improvement in or relating to mounting for the wall of a pressure vessel. This example pertains to the constructions of a gas-storage sphere with an 18 meter diameter and a volumn of about 3,000 cubic meters of liquefied gas at a maximum pressure of 15 atmospheres which is approximately 200 psi. It has been normal commercial practice to use for the manufacture of such spheres a fine grain structural steel of good weldability.

In this example there is used a steel with a composition of

| | |
|---|---|
| C | less than 0.20% |
| Si | 0.10 to 0.50% |
| Mn | 0.90 to 1.60% |
| P & S | less than 0.040% |

This steel has the grain refined with either about 0.015% Al or 0.02% Cb or 0.05% V singly or in combination. All of these grades have been tested.

The steel of the gas-storage sphere has the following physical properties:

| | |
|---|---|
| tensile strength | 52 kg/mm2 |
| yield point | 36 kg/mm2 |
| elongation | 22% (1=5d) |

In accordance with requirements the sphere has a wall thickness of 35.8 mm and a weight of 310 metric tons.

Alternately, for the vessel there is used a low alloy Manganese-Nickel-Vanadium steel with a composition of

| | |
|---|---|
| C | less than 0.20% |
| Si | 0.10 to 0.50% |
| Mn | 1.20 to 1.70% |
| P & S | less than 0.035% |
| Ni | 0.50 to 0.80% |
| V | 0.10 to 0.22% | and this steel has the following physical properties

| | |
|---|---|
| tensile strength | 52 kg/mm2 |
| yield point | 51 kg/mm2 |
| elongation | 16% (1=5d) |

Figures 1A, 1B:
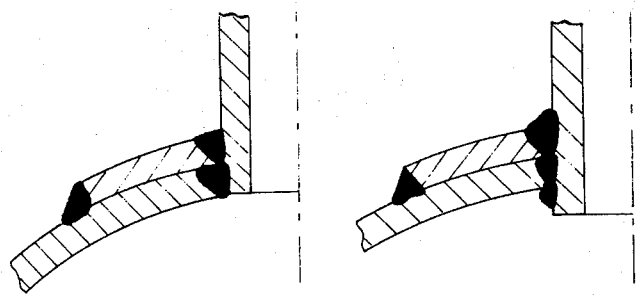
FIGS. 1a and 1b show sections through conventional welded and reinforced joints.

The wall of the sphere could be reduced to a thickness of 29.3 mm, but if this is done, then the notch sensitivity of the flanged connection of normal design of the prior art in FIGS. 1a and 1b herein, requires a substantial wall thickness increase for safety purposes. Therefore, the use of this higher strength steel brings no practical advantage over the first one.

Now, using the new type connection members disclosed in FIGS. 2, 3 and 4 in the present application, it has been possible to construct the sphere with an even more sensitive high strength low alloy steel of

| | |
|---|---|
| C | less than 0.20% |
| Si | 0.10 to 0.40% |
| Mn | 0.20 to 0.60% |
| P & S | less than 0.025% |
| Cr | 0.20 to 0.60% |
| Mo | 0.20 to 0.60% |
| Ni | 3.0 to 3.7% |
| Ti | less than 0.05% |
| V | 0.03 to 0.08% | this has

| | |
|---|---|
| tensile strength | 80 kg/mm2 |
| yield point | 70 kg/mm2 |
| elongation | 17% (1=5d) |

The wall of the sphere has only a thickness of 24 mm, the sphere weight is reduced to 210 tons. This was only made possible by the use of the novel type connection members, which offer the additional great advantage to permit straight connections even at relative small angle to curved surface of the sphere (illustrated with FIGS. 2 and 3) of the application. A number of codes, as for example, the ASME-Pressure-Vessel-Code Section III give formulas to calculate the construction requirements in view of the static load.

Under these codes, spherical tanks for the storage of liquified gas must be constructed to be safe under repeated load cycling and with due consideration for the swelling and diminishing pressure accompanying these.

From this stems the requirement to limit the maximum permissible pressure vairation during the load cycles to 20 – 30% of the maximum static load, for the safe cycling life of the constructions made under prior art practice and where the weakest point with ferritic steels is the notch of weldments for flanges and connections.

The present novel connection members in accordance with FIGS. 2, 3 and 4 now allow a construction where the maximum permissible pressure variation during load cycles can be 100% of the maximum static load and where even then the safe cycling life is extended more than fivefold when compared to prior commercial construction of FIGS. 1 and 2.

What I claim is:

1. A method for the connection of a steel pipe to a pressure vessel of uniform thickness composed of high quality low carbon steel, comprising:

cutting an opening in a wall of said pressure vessel which is of substantially larger diameter than that of the pipe;

joining a connection member to said pipe and to said opening which consists of a forged bored disc of lenticular shape having a thickened central portion and a rim, the thickness of said disc in the region of said rim being equal to the thickness of the wall of the pressure vessel, and the thickness of said disc in the region of its bore being several times the thickness of the rim;

said joining being by a first welding step of said pipe to said connection member in the region of said bore, whereby the first weld at the edge of said bore merges into the lenticular form at the thickened central portion adjacent the bore connection to provide better impact strength at the first weld, and by a second welding step in smooth transition between the disc and vessel, in which there is provided a smooth transition between the material of the pipe wall, material of the disc, and of the vessel's wall.

* * * * *